United States Patent [19]
Schimke

[11] 3,848,774
[45] Nov. 19, 1974

[54] MEASURING AND DISPENSING CAP

[76] Inventor: Lloyd J. Schimke, Box 1272 Hwy. 2, East Minot, N. Dak. 58701

[22] Filed: Jan. 24, 1973

[21] Appl. No.: 326,190

[52] U.S. Cl............ 222/36, 222/453, 222/478
[51] Int. Cl............................................ G01f 11/38
[58] Field of Search....... 222/36, 38, 447, 453, 478, 222/305

[56] References Cited
UNITED STATES PATENTS

| | | | |
|---|---|---|---|
| 1,226,108 | 5/1917 | Olney | 222/305 |
| 2,086,115 | 7/1937 | Blickman | 222/305 |
| 2,281,727 | 5/1942 | Stewart | 222/478 |
| 2,504,145 | 4/1950 | Morrone | 222/38 |
| 2,506,125 | 5/1950 | White | 222/453 X |
| 3,072,289 | 1/1963 | Stopp | 222/453 X |
| 3,141,585 | 7/1964 | Emmert | 222/453 |
| 3,419,187 | 12/1968 | Bazarnic | 222/36 |

*Primary Examiner*—Robert B. Reeves
*Assistant Examiner*—Thomas E. Kocovsky

[57] ABSTRACT

A measuring and dispensing cap suitable for use in combination with a beverage bottle or the like. The cap includes a measuring chamber having both an inlet and an outlet. Valve means are provided for selectively opening and closing the inlet and outlet. Preferably, the cap includes a digital counter for recording the number of measures of liquid which have been dispensed through the cap.

7 Claims, 8 Drawing Figures

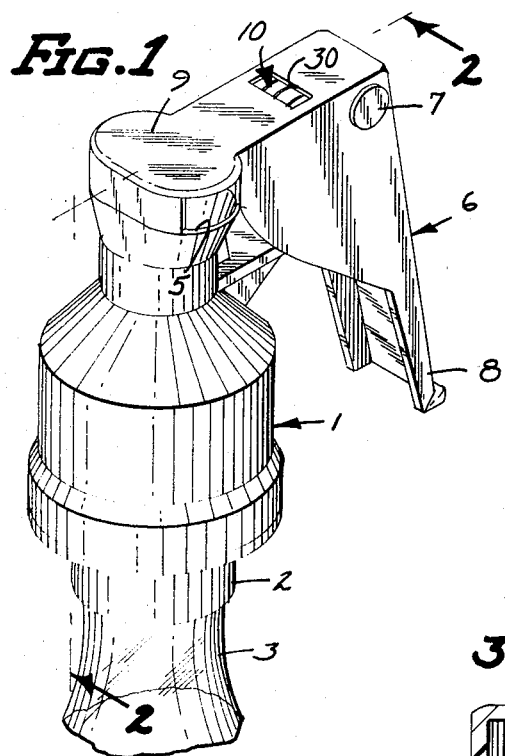
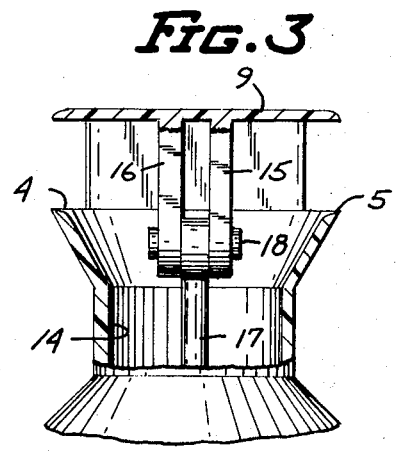
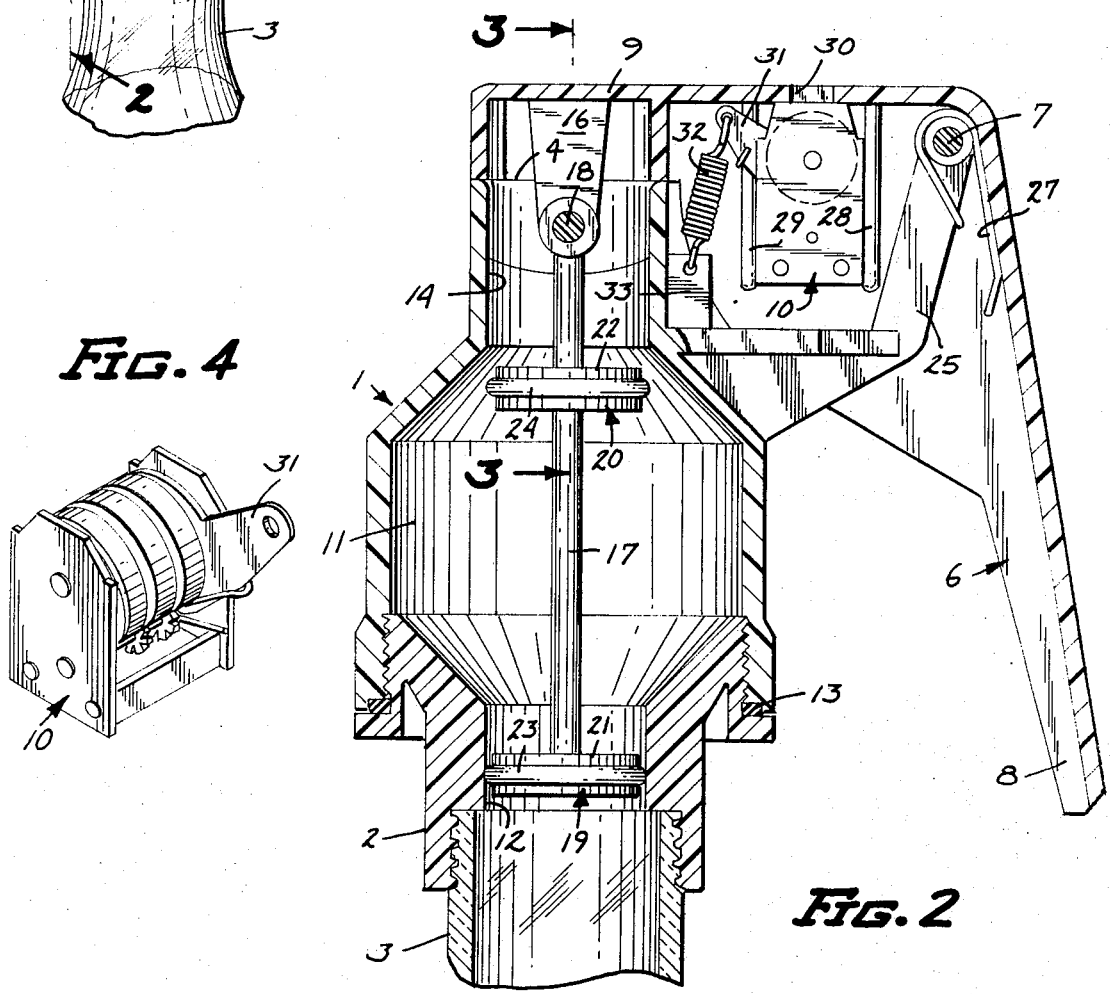

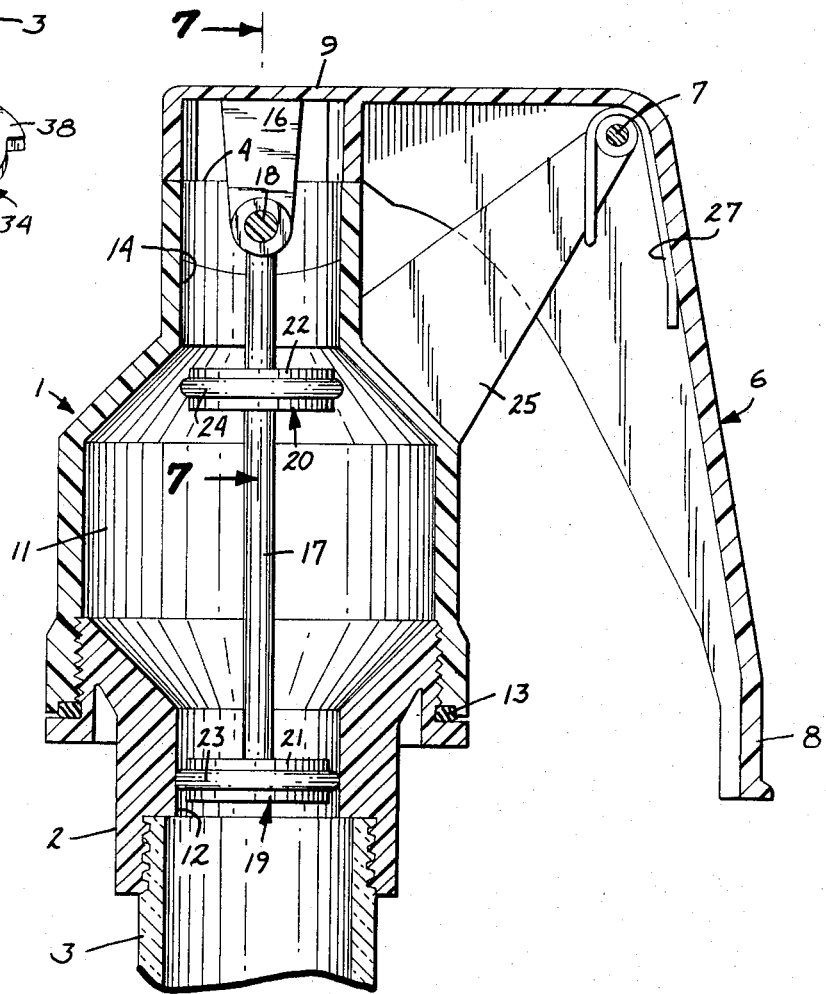

MEASURING AND DISPENSING CAP

BACKGROUND OF THE INVENTION

There are many instances in which it is desirable to have some means of accurately measuring and dispensing selected amounts of liquid from a container which holds the liquid in bulk. One need for such a device occurs when alcoholic beverages are dispensed from bottles. It is important to accurately measure and control the quantity of liquor which is dispensed, particularly in commercial bars.

A dispensing cap suitable for use in combination with a beverage bottle or the like is disclosed in U.S. Pat. No. 3,419,187. The dispensing cap shown in that patent is normally secured to the top of a bottle and is actuated through the use of a handle. According to the patent, the handle can be actuated only when the bottle is upside down (i.e. inverted). Each time the bottle is tipped upside down, liquid from the bottle flows into a measuring chamber within the cap and upon actuation of the dispensing handle, the inlet to the measuring chamber is sealed from the bottle. Upon further depression of the actuating handle, the outlet valve is opened to permit the liquid to flow from the measuring chamber through a spout. As the handle is moved to open the outlet valve and allow the liquid to flow out, it also actuates a registration device to register a higher number. As a consequence, the number of times a measured amount of liquid has been dispensed from the bottle is visibly recorded on a rotating dial numbered from 0–64 to reflect the number of ounces of liquid contained in a quart. With this prior art device, a tamper-proof seal is provided so that the measuring and dispensing cap cannot be removed from the beverage bottle without breaking the seal. Further, the number shown on the registration dial is responsive to movement of the handle and the numbers cannot be altered without breaking the tamper-proof seal. In this manner, a tavern owner can record and control the amount of liquor dispensed from each of the liquor bottles used.

The measuring and dispensing cap described in U.S. Pat. No. 3,419.187 is in commercial use. However, experience has shown that while the caps made according to U.S. Pat. No. 3,419,187 offers certain advantages over the prior art, these caps have certain undesirable features or limitations. For example, a tavern owner must have a large inventory of these dispensing caps since each cap is individually sealed to its own bottle and cannot be transferred to another bottle without breaking the tamper-proof seal and resetting the counter to zero. The device also has a substantial number of parts which complicates cleaning and repair. Also, the device does not always work well over extended periods of time with syrupy liquids such as creme de menthe which may be used at a relatively slow rate (e.g. in small taverns a single bottle may not be exhausted after 20 or 30 days of use). Further, the spout of the device provides for only unidirectional pouring.

SUMMARY OF THE INVENTION

The present invention is a measuring and dispensing cap suitable for use in combination with a beverage bottle or the like. Although it is superficially similar to the dispensing cap of U.S. Pat. No. 3,419,187, the measuring and dispensing cap of the present invention is substantially simpler in construction than the measuring and dispensing cap of U.S. Pat. No. 3,419,187. As a result, it is easier to clean and maintain. Furthermore, the measuring and dispensing caps of the present invention operate in a different fashion than the devices of U.S. Pat. No. 3,419,187.

The differences between the devices of the present invention and the devices of U.S. Pat. No. 3,419,187 result in such advantages as the more efficient handling of syrupy liquids, ease of cleaning and maintenance, faster pouring and the like. Other advantages will be apparent from reading the detailed description which follows.

THE DRAWINGS

FIG. 1 is a perspective view of a measuring and dispensing cap equipped with a digital counter.

FIG. 2 is a cross-sectional view of the dispensing cap of FIG. 1 as taken along the plane 2—2 of FIG. 1 in the direction of the arrows.

FIG. 3 is a fragmentary sectional view of the dispensing cap shown in FIG. 2 as taken along the plane 3—3 in the direction of the arrows.

FIG. 4 is an enlarged view of the digital counter.

FIG. 5 is a perspective view of a measuring and dispensing cap suitable for home use.

FIG. 6 is a cross-sectional view of the dispensing cap of FIG. 5 as taken along the plane 6—6 in the direction of the arrows.

FIG. 7 is a partial fragmentary view of the dispensing cap of FIG. 6 as taken along the plane 7—7 in the direction of the arrows.

FIG. 8 is a perspective view of a displacing element.

DETAILED DESCRIPTION

The measuring and dispensing caps of the present invention are particularly suited for the dispensing of liquids from beverage bottles. They are particularly effective for use in dispensing alcoholic beverages from bottles. For commercial use, the measuring and dispensing caps of the present invention will generally be provided with a quick acting digital counter for recording the number of measures of beverage which have been dispensed from the bottle through the dispensing cap. For home use, the digital counter can generally be omitted.

For strength and ease of cleaning, the measuring and dispensing caps of the present invention are desirably formed of an impact resistant plastic and the individual parts are designed with generally smooth, easily cleaned surfaces.

As shown in FIG. 1, the measuring and dispensing caps include a body generally designated by the numeral 1. The lower portion of body 1 is provided with some means (e.g. a screw adapter) 2 for selectively connecting the body 1 to the open end of a beverage bottle 3. The upper portion of the body 1 is provided with two laterally facing and oppositely directed pouring spouts 4 and 5. A handle 6 is pivotally attached to the body 1 by pin 7. The lower end 8 of handle 6 is biased away from body 1. This causes the upper end 9 of handle 6 to be biased toward the outlet end of body 1. The dispensing cap further includes a digital counter 10 for purposes of indicating the number of measures of liquid which have been dispensed through the cap. Desirably, this digital counter will be quick acting and it records the next highest number whenever the lower portion 8 of handle 6 is squeezed toward body 1. Desirably, this counter will operate when the lower portion 8 of handle 6 is moved through less than the first 50% of its travel toward body 1 from its biased position which is away from body 1.

As shown in FIG. 2, a measuring chamber 11 is formed within body 1. The size of this measuring chamber is a matter of design selection. In the case of dispensing caps intended for liquor control, the maximum volume of measuring chamber 11 will normally be 1–2 fluid ounces. A measuring chamber having a volume of 1½ ounces is especially desirable.

As shown in FIG. 2, the lower portion of body 1 is threaded to receive an adapter 2 which serves to form the inlet 12. The adapter 2 includes some means (e.g. threads) for selectively attaching the cap in a sealed relationship to a beverage bottle or the like. Since various beverage bottles have different types of closures (e.g. coarse or finely threaded screw type closures) it is convenient to provide the dispensing caps of the present invention with several adapters 2, each of which is designed to accomodate a different type of beverage bottle. Ease of attachment of adapters 2 to beverage bottles 3 can be achieved in the case of threaded connections by use of 4-start threads. Using 4-start threads allows the cap handles on a plurality of bottles to be uniformly aligned with respect to the labels on the bottles, which customarily all face frontward for easy identification. For example, all cap handles can be positioned generally to the rear of the bottle or in some other desired direction. This makes it easier for a bartender to grab a bottle and the uniform alignment has a pleasing appearance. If desired or required, the adapter 2 can be sealed against body 1 by means of an O-ring 13. The upper portion of body 1 includes an outlet 14. It is preferred that at least a portion of inlet 12 and outlet 14 be cylindrical in shape to thereby permit the use of disc type inlet and outlet valves. Desirably, these cylindrical portions of inlet 12 and outlet 14 will have substantially the same axis.

As shown in FIG. 2, and as shown more clearly in FIG. 3, the upper end 9 of handle 6 is provided with two downwardly extending flanges 15 and 16 to which is pivotally attached a valve shaft 17 by means of pin 18. Connected to valve shaft 17 is an inlet valve generally designated by the numeral 19 and an outlet valve generally designated by the numeral 20. These valves are preferably constructed of valve discs 21 and 22, respectively, each of which carries an O-ring 23 and 24, respectively, in an annular groove located in their respective valve discs, the purpose of which is to provide a sealing relationship with the inlet or outlet (as appropriate). Desirably, both valves 19 and 20 will have the same cross-sectional areas.

Inlet valve 19 and outlet valve 20 are positioned on valve shaft 17 so that inlet valve 19 effectively seals the inlet 12 when handle 6 is in its normal biased position. In this normmal or static position, outlet valve 20 is in an open position with regard to outlet 14, thereby permitting the free passage of liquid from measuring chamber 11 through outlet 14 whenever the dispensing cap is inverted or tipped sufficiently. Valves 19 and 20 can be integrally molded with valve shaft 17 or they can be made separately and attached to valve shaft 17.

As shown in FIG. 2, handle 6 is attached to a supporting arm 25 (which can be molded as part of body 1) by means of a pin 7. Biasing handle 6 so that the lower portion 8 is normally away from body 1 is accomplished by means of a looped wire spring 27 which is mounted within handle 6 and is looped around supporting arm 25.

Within handle 6 is supported a digital counter generally designated by the numeral 10. As shown in FIG. 2, this digital counter 10 is held by friction between lips 28 and 29 which are formed on an inside wall of handle 6. A viewing frame 30 is provided in handle 6 so that the digital counter 10 can be read. If desired a window (e.g. a clear plastic window) can be inserted in viewing frame 30. As shown in FIG. 2, the digital counter includes a trigger 31 which is connected to the body 1 of the dispensing cap by means of a spring 32 which is anchored to body 1 at flange 33. The arrangement of the counter 10 is such that the trigger 31 will be activated promptly whenever the lower portion 8 of handle 6 is squeezed toward body 1. Experience has shown that the use of the dispensing cap as a part of commercial liquor control measures is enhanced if the counter includes at least three counting elements. For most purposes, three counting elements is sufficient. Thus, the device should be capable of indicating from 000 up to 999. A particularly sensitive and useful digital counter is one manufactured by Veeder-Root Company of Minneapolis, Minn.

FIGS. 5, 6 and 7 illustrate an embodiment of the present invention suitable for home use where ease of measuring and dispensing is desired, but where the control provided by the digital counter is not essential. The device shown in FIGS. 5, 6 and 7 is substantially the same in construction as the device shown in FIGS. 1–3 except that the elements of the device relating to the digital counter have been omitted. Also, for home use, the dispensing cap does not need to be of the same rugged construction required of a commercial unit. As shown in FIGS. 5–7, the various elements of the device have been numbered to correspond with the corresponding elements as shown in FIGS. 1–3.

In FIG. 8 is shown a displacing element generally designated by the numeral 34. This displacing element 34 is intended to be placed within measuring chamber 11 in a plane generally perpendicular to valve shaft 17 to thereby alter the capacity of the measuring chamber for liquid being dispensed. In dispensing liquor, it is convenient to use displacing elements 34 having a displacement equal to about one-eighth ounce of liquid. As shown in FIG. 8, the displacing element includes a central aperture 35 which must be large enough to accomodate shaft 17 and preferably large enough to permit the displacing element 34 to be passed over either inlet valve 19 or outlet valve 20 so that the displacing element will be positioned between the two valves. This central aperture 35 permits liquid to pass through the center of the displacing element. The displacing element 34 is also provided with two closely spaced peripheral tabs 36 and 37 whose purpose in combination is to space the main portion of displacing element 34 away from the lateral walls of measuring chamber 11. Also, it is convenient to construct a vertical ridge or other form of guide (not shown) along a portion of the inside wall of measuring chamber 11 so that displacing element 34 can be positioned by the guide by, for example, allowing tabs 36 and 37 to embrace the guide between them. Generally opposite tabs 36 and 37 is another tab 38 which also serves to space the main portion of displacing element 34 away from the walls of measuring chamber 11. By using a displacing element of this construction, liquid will flow through both the center opening of the displacing element and around the outer walls of the displacing element, along the rim of the displacing element between the various tabs 36, 37 and 38. If desired, more than one displacing element 34 can be used. The displacing elements 34 of the present invention offer the advantage that a single size of displacing element can be used singly or in multiples to achieve a desired capacity of measuring chamber 11. This is a distinct advantage over certain known prior art displacing elements which have been used in measuring and dispensing caps.

The use of the measuring and dispensing caps of the present invention will be understood by reference to the following description which is made with reference to a measuring and dispensing cap of the type shown in FIGS. 1-3 used in conjunction with bottled liquor.

A bottle of liquor 3 is opened. If the adapter 2 of the dispensing cap is not suited for connection with the top of liquor bottle 3, it is replaced with a suitable adapter 2. The dispensing cap is then attached to bottle 3 by, for example, screwing adapter 2 onto the threads provided at the top of liquor bottle 3. Although it is not normally necessary, it is possible to use a washer or O-ring in the female portion of adapter 2 to ensure a fluid-tight seal between bottle 3 and adapter 2. The number shown in frame 30 is recorded for control purposes. Although it has been assumed for purposes of this illustration that the capacity of measuring chamber 11 is appropriate for the desired use, it should be understood that one or more displacing elements 34 as shown in FIG. 8 can be inserted into measuring chamber 11 to reduce its volumetric capacity. When it is desired to pour a measured amount of liquor from bottle 3, the dispensing cap and handle are firmly grasped by the hand, usually by placing the thumb around the left side of body 1 as shown in FIG. 2 and the fingers around handle 6. By squeezing the thumb and fingers together, the lower portion 8 of handle 6 is moved from its normal position in a direction toward body 1. This movement of handle 6 causes digital counter 31 to be rotated in a clockwise direction around pin 26 as shown in FIG. 2. The resistance created by spring 32 causes trigger 31 to be tripped, thereby causing digital counter 10 to register the next highest number in frame 30. As lower portion 8 of handle 6 is squeezed toward body 1 against the biasing action of spring 27, the upper end 9 of handle 6 is raised, thereby lifting valve shaft 17 and causing outlet valve 20 to close outlet 14. Since inlet valve 19 is mounted on valve shaft 17 for coordinated movement with outlet valve 20, upward movement of valve shaft 17 causes the inlet valve 19 to be withdrawn from inlet 12 and moved into an open position. The length of inlet 12 and outlet 14, as well as the positioning of valves 19 and 20 on valve shaft 17, are designed to permit proper coordination of the valves 19 and 20. The dispensing cap and bottle combination is then inverted, thus allowing alcoholic beverage to flow from bottle 3 into measuring chamber 11. Since the outlet 14 of measuring chamber 11 has been closed by action of outlet valve 20, the amount of liquid pouring into measuring chamber 11 is limited by the volumetric capacity of measuring chamber 11. The filling of measuring chamber 11 is quite rapid. When the measuring chamber 11 has been filled and the dispensing cap is located in a generally inverted position over a suitable receptacle (e.g. a cocktail glass), the pressure on handle 6 is released, thereby permitting the lower portion 8 of handle 6 to return to its normal biased position. This movement of lower portion 8 of handle 6 causes the upper portion 9 of handle 6 to be lowered, thereby closing inlet valve 19 and opening outlet valve 20. The liquid contained within measuring chamber 11 is then discharged by gravity from the measuring cap through either spout 4 or 5 as shown in FIG. 3. By providing the outlet 14 with two opposed and oppositely facing pouring spouts 4 and 5, it is possible for the dispensing cap of the present invention to be used easily by persons who are either lefthanded or righthanded.

At the end of any work shift or day, inventory of liquor can be checked by inspecting and recording the numbers shown by the digital counters on all of the dispensing caps then in use. When a bottle of liquor is exhausted, the number can be recorded and a new bottle attached to the dispensing cap. In this manner, it is possible to keep an accurate record of the number of drinks poured from a single bottle or a series of bottles. Since the volume of each bottle is know, and since the volume of measuring chamber 11 is known, it is easy to correlate the numbers which appear in frame 30 with the amount of alcoholic beverage that has been dispensed. In this manner, it is possible to keep accurate control over the sale or other disposition of alcoholic beverages.

In use, measuring and dispensing caps of the present invention have been found to enable one to pour shots of alcoholic beverages faster than certain prior art devices. The dispensing caps of the present invention contain only a relatively few parts which results in simplified cleaning and maintenance. Further, the measuring and dispensing caps of the present invention are effective in handling syrupy liquids such as creme de menthe, etc. For example, a device constructed according to the present invention has been used to pour several shots of Karo syrup daily for a period of 30 successive days. During this period of time, the measuring and dispensing cap continued to function properly without cleaning. Further, the measuring and dispensing caps of the present invention which are equipped with a three digit, digital counter do not require presetting to zero each time the dispensing cap is transferred to another bottle. All that is required is that the existing counter reading be recorded so that the number of drinks poured from the bottle can be checked against the number of drinks which could have been poured from the bottle. This type of checking effectively prevents bartenders from pouring extra strong drinks or giving away free drinks.

What is claimed is:

1. A cap for measuring and dispensing predetermined amounts of liquid from a container, comprising:
   a. a body defining a measuring chamber of predetermined volume, the chamber having a cylindrical outlet located at the top of said body;
   b. means for adapting and connecting the bottom of said body to an opening in the liquid container, said adapting and connecting means defining a cylindrical inlet which is in communication with the measuring chamber and the container opening aligned with the outlet;
   c. a shaft having top and bottom ends;

d. inlet and outlet valve discs fixedly mounted on said shaft, each being movable in a sealing relationship within the cylindrical inlet and outlet, repectively, for opening and closing the inlet and outlet, the outlet valve mounted toward the top end of said shaft and the inlet valve mounted toward the bottom end of said shaft;

e. a single acting handle rotatably mounted on said body, the handle having upper and lower ends;

f. means for pivotally connecting the upper end of said handle to the upper end of said shaft to urge said shaft in a direction away from the liquid container when said handle lower end is moved toward said body;

g. means for biasing the lower end of said handle away from said body, in which position said inlet is closed by said inlet valve and said outlet is open, and when said handle is moved toward said body, said inlet is opened and said outlet is closed by said outlet valve;

h. first and second pouring spouts located at the top of said body and in communication with the outlet, the spouts being located opposite each other and each spout spaced about 90° from said handle.

2. The measuring and dispensing cap as recited in claim 1 wherein the adapting and connecting means includes 4-start threads so that said adapting and connecting means, and hence said body and handle, can be uniformly positioned with respect to the container.

3. A cap for measuring and dispensing predetermined amounts of liquid from a container, comprising:

a. a body defining a measuring chamber of predetermined volume, the chamber having a cylindrical outlet located at the top of said body;

b. means for adapting and connecting the bottom of said body to an opening in the liquid container, said adapting and connecting means defining a cylindrical inlet which is in communication with the measuring chamber and the container opening aligned with the outlet;

c. a shaft having top and bottom ends;

d. inlet and outlet valves fixedly mounted on said shaft, for opening and closing the inlet and outlet, the outlet valve mounted toward the top end of said shaft and the inlet valve mounted toward the bottom end;

e. a handle rotatably mounted on said body, the handle having upper and lower ends;

f. means for pivotally connecting the upper end of said handle to the upper end of said shaft;

g. means for biasing the lower end of said handle away from said body, in which position said inlet is closed by said inlet valve and said outlet is open, and when said handle is moved towards said body, said inlet is opened and said outlet is closed by said outlet valve;

h. first and second pouring spouts located at the top of said body and in communication with the outlet, the spouts being located opposite each other and each spout spaced about 90° from said handle;

i. said adapting and connecting means including 4-start threads so that said adapting and connecting means, and hence said body and handle, can be uniformly positioned with respect to the container; and j. means for uniformly displacing liquid volume within said measuring chamber, comprising:

i. a ridge on a lateral wall of the measuring chamber; and ii. a set of displacing elements, each member of the set being a uniform disc which is placed in the measuring chamber in a plane generally perpendicular to said shaft, each disc having a central aperture larger than the diameter of said valves and said shaft, first and second peripheral tabs for positioning the disc with respect to said ridge, and a third peripheral tab generally opposite the first and second tabs, the tabs centrally positioning the disc in the measuring chamber.

4. The measuring and dispensing cap as recited in claim 3 wherein the measuring chamber has a liquid volume of about 1½ ounces.

5. The measuring and dispensing cap as recited in claim 4 wherein each disc displaces a liquid volume of about one-eighth of an ounce.

6. The measuring and dispensing cap as recited in claim 5 including in addition, rings mounted on the periphery of said valves to provide a seal between the valves and the inlet and outlet.

7. The measuring and dispensing cap as recited in claim 6 including in addition a three-stage decimal digital counter mounted in said handle, which is actuated each time said handle is moved towards said body and before said handle has traveled halfway towards said body.

* * * * *